March 28, 1961 H. F. COHRT 2,977,097
REFRIGERATION APPARATUS
Original Filed July 10, 1958 2 Sheets-Sheet 1
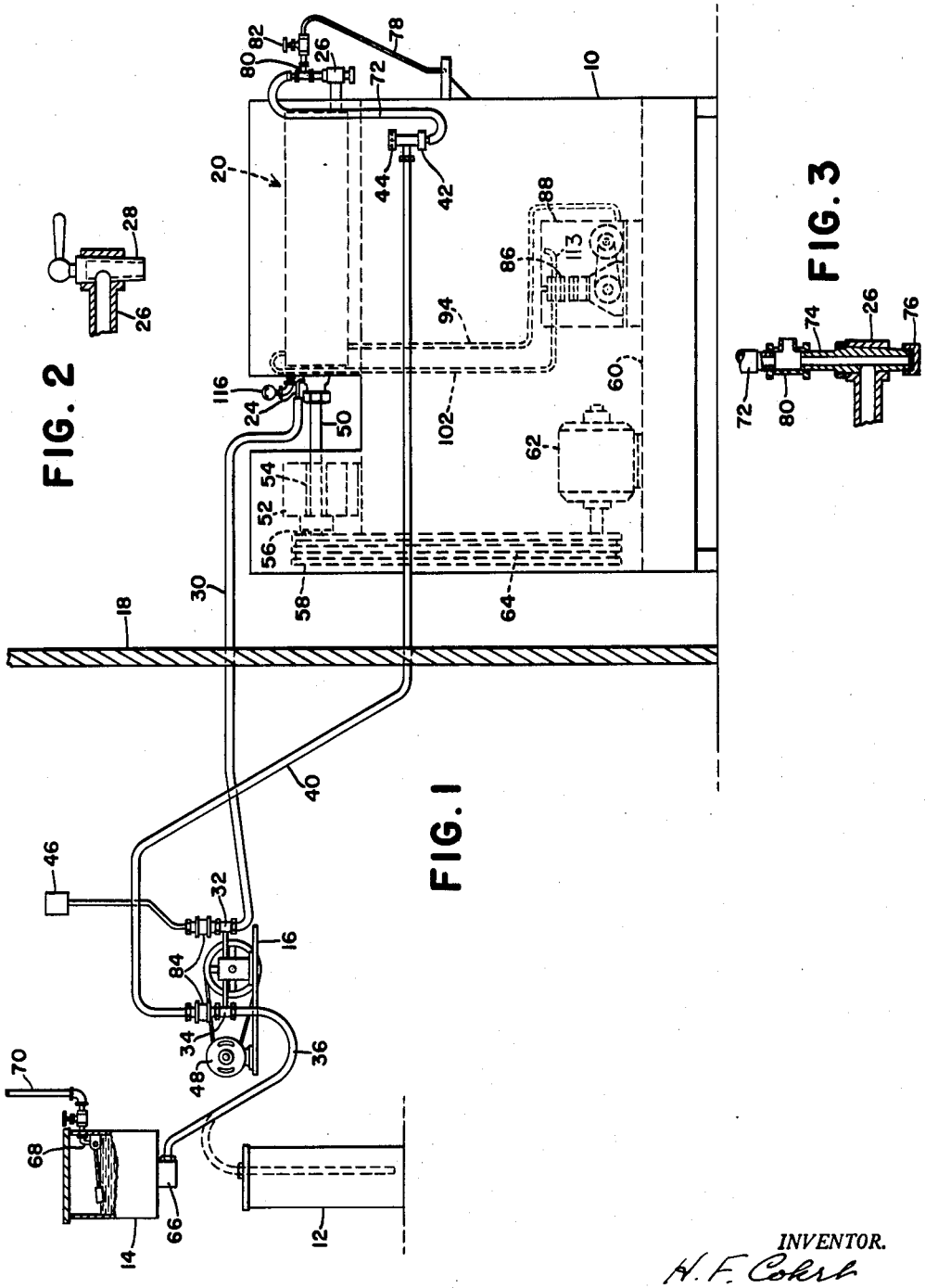
INVENTOR.
H. F. Cohrt
BY
ATTORNEY March 28, 1961 H. F. COHRT 2,977,097
REFRIGERATION APPARATUS
Original Filed July 10, 1958 2 Sheets-Sheet 2
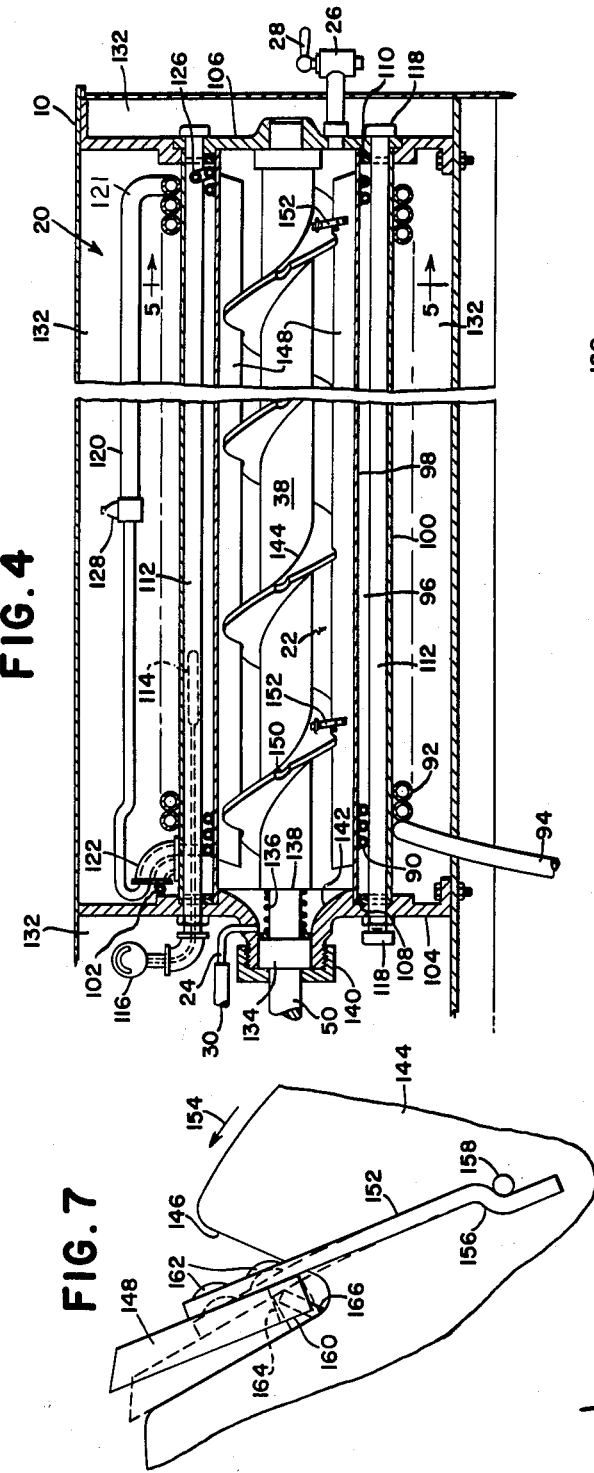
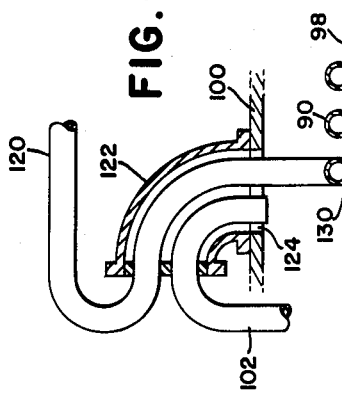
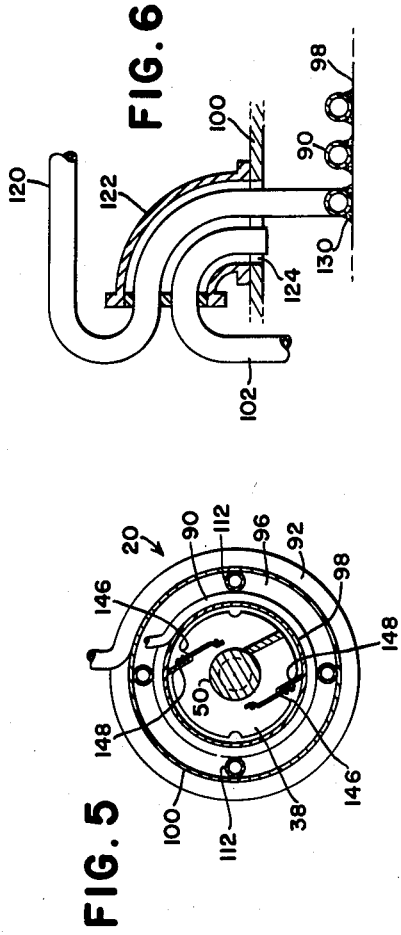
INVENTOR.
H. F. Cohrt
BY
ATTORNEY United States Patent Office
2,977,097
Patented Mar. 28, 1961

2,977,097

REFRIGERATION APPARATUS

Henry F. Cohrt, R.R. 2, Box 167, Huron, S. Dak.

Original application July 10, 1958, Ser. No. 747,640, now Patent No. 2,961,853, dated Nov. 29, 1960. Divided and this application June 15, 1959, Ser. No. 820,228

3 Claims. (Cl. 259—9)

This invention relates to refrigeration apparatus and more particularly to such apparatus as adapted for use in the preparation, mixing and dispensing of semi-solid refrigerated refreshments such as ice cream, ice milk, frozen desserts and the like. This application is a division of my co-pending application serial No. 747,640, filed July 10, 1958, now Patent No. 2,961,853, dated November 29, 1960.

It is a significant object of the invention to provide a novel refrigerating unit comprising inner and outer members, preferably in the form of concentric cylinders, and associated surrounding refrigerant-conducting coils so arranged as to obtain the utmost in refrigeration efficiency by exploiting the principles of pre-cooling, counterflow and improved heat exchange. Another important object resides in a novel and improved arrangement involving the mixing, feeding and dispensing of the product, together with an arrangement enabling periodic washing of the apparatus in the interests of higher efficiency and sanitation. Still further objects reside in refinements of the mixing chamber construction, in the feeding and mixing auger or equivalent element, and in the general arrangement of the apparatus so as to enable it to be readily converted from the mixing cycle to the washing cycle and vice versa.

These and other important objects and desirable features inherent in and encompassed by the invention will become apparent as the invention is disclosed, in a presently preferred embodiment thereof, in the ensuing description and accompanying drawings, the figures of which are described immediately below.

Figure 1 is a general view of the entire apparatus.

Figure 2 is a fragmentary enlarged section of the spigot or outlet construction.

Figure 3 is a fragmentary enlarged section of the outlet when the spigot is replaced by a recirculating and drain means.

Figure 4 is an enlarged section through the refrigerating unit and chamber.

Figure 5 is a section on the line 5—5 of Figure 4.

Figure 6 is an enlarged section through the connection of part of the refrigerant-conducting tubing to the cylinders.

Figure 7 is an enlarged fragmentary view of the blade-to-auger mounting.

The apparatus shown in over-all aspect in Figure 1 comprises a mixing and dispensing cabinet structure 10; a source of mixable material, such as ice milk, ice cream, dessert etc. represented by a typical container 12; a source of washing fluid, such as water contained in a reservoir or tank 14; and a pump 16. The cabinet may be of any suitable construction, such as found in the typical store or drive-in in which the dairy or like product involved here is sold. As indicated, the pump 16 and containers or tanks 12 and 14 are located relatively remotely from the cabinet, preferably being separated from the cabinet by a wall 18.

The cabinet, as is conventional, is covered with stainless steel sheet and also contains appropriate insulation in at least its upper portion to insulate a refrigerating unit, designated in its entirety at 20 and best shown as to details and interior construction in Figure 4. For the present, this unit may be considered only generally, with emphasis on its relation to the over-all system, except that reference at this time will be had to Figure 4 for the purpose of pointing out that the unit has a refrigerated mixing chamber 22 and is provided at its rear end with an inlet 24 and at its front end with an outlet 26. When the apparatus operates in its mixing and dispensing cycle, the outlet 26 is fitted with a spigot 28 (Figure 2) and the inlet 24 is connected by a line or conduit 30 to the discharge side 32 of the pump 16. The intake side 34 of the pump is connected by a conduit means or line 36 at this time to the container 12 (dotted line, Figure 1) so that the pump will supply mixable material to the unit chamber 22 in which it is mixed by a beater, here in the form of a bladed auger 38 (Figure 4).

Also connected to the intake side of the pump is a conduit means or line 40, and the other end of this line is connected to a conventional air inlet means 42 having a control knob or the like 44 for regulating the amount of air taken in. Thus the mix in the chamber 22 is aerated and the combination of the air pressure and the mixing auger facilitates both mixing and dispensing of the product when the spigot 28 is opened. A conventional pressure regulator 46 may be connected to the pump to start and stop same automatically in response to pressure variations, say, between eight and eleven p.s.i., for example. The intake and discharge sides of the pump are of course equipped with appropriate check valves (not shown) as is conventional. The pump may be driven by an electric motor 48.

The mixing auger has a central shaft 50 which projects rearwardly for support in a bearing 52 and is axially removably coupled at 54 to a drive shaft 56 to which is keyed a sheave 58. The base 60 of the cabinet carries an electric motor 62 which drives the sheave 58 via a belt 64.

The apparatus must be washed periodically for sanitary reasons and it is in this respect that the invention displays one of its significant features. In the utilization of the washing cycle, only a few changes need be made. The line 36 is removed from the container 12 and is alternatively connected to the water tank 14, which is equipped with a suitable on-off valve 66 that may be electrically operated from a position convenient to the front of the apparatus. The tank is also provided with a float valve 68 for controlling a hot water supply line 70. However, the water standing in the tank will be cold as long as the float valve shuts off the line 70; hence, the initial supply of wash water fed to the chamber 22 will of course be cold, which is desirable.

Preparation of the apparatus for the washing cycle also involves the use of a jumper line 72, one end of which is connected to the lower end of the air inlet 42 and the other end of which has a fitting 74 which is substituted for the removed spigot 28 (Figures 1 and 3). The lower end of the fitting 74 is capped at 76. During operation of the apparatus in the mixing and dispensing cycle, the lower end of the air inlet 42 is capped but this cap is removed to accommodate the jumper line 72 in the wash cycle. A drain 78 is connected to the jumper line by a T 80 and a shut-off valve 82.

Before the above changes are made, the apparatus is run through its mixing and dispensing cycle without taking in any more mix from the container 12 and then the conversion for the wash cycle is effected. The valve 66 is opened and the pump 16 pumps cold water from the tank 14 to the chamber 22. The drain is shut off at 82 and the cold water is recirculated back to the pump via the jumper line 72 and the line 40. At this time the air inlet control knob 44 is closed to exclude air from the system. The valve 66 may be manually closed until sufficient recirculation has been achieved; then the valve 66 is opened, and the drain valve 82 is likewise opened, the line 78 leading to any suitable receptacle or to a sewer line if desired. As the pump operates, part of the wash water is discharged through the drain line 78 and part is recirculated, and additional water is taken in from the tank 14 via the open valve 66. As the water level in the tank lowers, the float valve admits hot water and ultimately hot water will be discharged at the drain line. At this time, the T 80 is removed, or the jumper line may be disconnected from the T, and liquid detergent introduced at the outlet 26, the pump 16 and the motor 62 having been temporarily stopped. The disconnection thus made is then connected and the pump and motor 62 started again, with the valve 66 closed while the water and detergent are circulated, after which the valve 66 and drain valve 82 are opened and the entire system rinsed and flushed until clear water is discharged. The valve 66 is again closed and the apparatus cleared of water and it is then restored for operation in the mixing and dispensing cycle by removing the jumper line, replacing the spigot, and connecting the intake line 36 to the container 12. Thus by an extremely simple rearrangement of parts, the dual cycles are readily accomplished, with obvious advantages. Sight glasses 84 may be provided at the pump to permit visual inspection of the circulation and if desired, and when permitted by law, the lines 30, 40 and 72 may be clear plastic; although, any suitable material may be employed.

The chamber 22 is refrigerated by a refrigeration system including a cabinet-carried compressor 86 and condenser 88 for effecting the circulation of refrigerant to inner and outer coils 90 and 92 in the unit 20. The rear end of the outer coil, which is here shown as tubing of circular cross section but which could be of square or other section, is connected to the high side of the system (to the condenser 88) by a line 94, and the rear end of the annular space 96 afforded between inner and outer concentric cylinder members 98 and 100 is connected to the low or suction side of the compressor by a line 102. The high side of the condenser may be connected to the compressor by a line 113. The two cylinders are closed at their rear and front ends by end closures 104 and 106, suitably sealed at 108 and 110 and secured together by tie members 112. These tie members are hollow and at least one of them receives the element 114 of a thermometer 116. The ends of the tie members not used for the receipt or connection of gages etc. are appropriately capped, as at 118. Thus the internal mix chamber 22 is separate from the annular space 96 and this space contains refrigerant on the principle of the flooded system. The cylinders as well as the coils are metallic and in heat-transfer relation. The outer coil 92 is wound from rear to front about the outer cylinder 100 and its front end 121 forms part of conduit means 120 which extends rearwardly for connection via an elbow 122 and an opening 124 (Fig. 6) in the outer cylinder 100 to the rear end of the inner coil 90. The inner coil is wound from rear to front and about the inner cylinder and has its front end, at 126, open for discharge into the front part of the annular space 96. An expansion valve 128, or its equivalent, is provided in the conduit means 120. As already described, the rear end of the annular space 96 is connected to the low side of the refrigeration system by the line 102. Hence, refrigerant is circulated from the condenser line 94 to the outer coil 92 and forwardly along the outer cylinder 100 and thence rearwardly via 120—128—122 to the inner coil 90 and thence forwardly along the inner cylinder to the front part of the annular space 96 at 126 and is thence withdrawn at 124—102 and returned to the compressor. As will be seen, the turns of the inner coil 90 are spaced apart axially of the inner cylinder 98 and are fixed to the cylinder, as by soldering etc. at 130 (Figure 6). This not only affords the effect of fins on the inner cylinder but provides spaces between the turns of the coil for receiving refrigerant contained in and passing through the space 96. As will be also noted, the tubing of the inner coil is of smaller cross-sectional area than that of the outer coil.

The inner coil not only cools the inner cylinder and thus the chamber 22 but it also pre-cools the outer coil and therefore materially increases the efficiency of the system. Further, the outer coil, being warmer, is more easily insulated against cold loss than if the insulation were to be applied directly to a single coil such as the inner coil. In the present case, insulation is used in the spaces 132 between the unit 20 and the cabinet walls and is omitted from the drawings in the interests of clarity and simplicity.

The dual coil arrangement cools the chamber 22 from rear to front and thus also has the same effect on the mix entering from the line 30. Moreover, the fin effect of the inner coil in combination with the flooded space 96 operates as an equalizer of temperature and cools entirely around the chamber 22 rather than from the bottom up.

Another feature of the invention resides in the seal arrangement for the rear end of the auger shaft 50. This is best shown in Figure 4 wherein the numeral 134 designates a conventional rotary seal, loaded axially by a spring 136 which abuts a shoulder 138 on the shaft 50. An external cap 140 retains the seal. The inlet 24 enters the end closure 104 radially of and immediately forwardly of the seal and the interior of the closure in this area is flared radially outwardly and forwardly at 142. This arrangement avoids the need for the use of lubricant at the seal and furthermore directs the entering mix axially into the chamber and removes some of the pressure of the mix on the seal because of the combination of centrifugal force and axial movement of the mix as impelled by the flare 142 and movement of the auger.

The auger is of novel construction, having a helical flight 144 wound on the shaft 50, and this flight is notched at 146 at axially spaced portions to carry a pair of diametrically opposed fore-and-aft blades 148. Additional notches 150 are provided in the flight 144 to contribute to the mixing function of the auger, inasmuch as these notches afford space for the mix to flow axially, or to "leak" past the flight, since a portion of the axial movement of the mix for dispensing is afforded by aeration by the pump 16.

Each blade is loosely received in a pair of axially alined notches and carries a pair of leaf springs 152 which serve as biasing means for urging the blade in the direction of rotation (arrow 154, Figure 7), of the auger. Each leaf spring has a terminal inner end formed as a hook 156 which hooks over a pin 158 carried by the auger. The shape of the notch 146 is such that the heel of the blade, as at 160, fulcrums at the bottom of the notch and when the blades are manually forced in the direction of auger rotation when installed in the cylinder 98 they assume the position shown in dotted lines in Figure 7 and thus conform themselves to the interior of the cylinder 98. The springs 152 maintain blade-to-cylinder contact and the auger flight runs in the cylinder with a close clearance. The spring pressure is thus directed more circumferentially and in the direction of auger rotation rather than directly radially outwardly and enables the maintenance of relatively uniform spring pressure even though the blades wear. The springs may be riveted to the blades at 162; although any equivalent means of fastening may be employed. Each blade is notched at 164 at axially spaced portions thereof and these notches cooperate with pins 166 carried by the auger flight in the flight notches 146 to prevent endwise displacement of the blades. The looseness of the fit between the notches 164 and pins 166 enables free movement of the blades under action of the springs 152.

The use and operation of the apparatus have been detailed along with the description thereof, as have the several novel and significant features of construction and the principle of the dual coil cooling arrangement. The apparatus is extremely flexible, simple and efficient, and is easy to service, clean and operate. At this point it may be well to observe the added significance of the flared portion 142, especially in conjunction with the washing cycle, because the area considered is easily flushed by the incoming water and moreover, the mix never accumulates there. In other respects, the preferred construction follows the carefully developed pattern disclosed, but it will be clear that the inventive features may be exploited in apparatus embodying variations and alterations of the preferred structure, all without departure from the spirit and scope of the invention.

What is claimed is:

1. In apparatus of the class described, the combination of: means affording a mixing chamber having an inlet and an outlet; a pump having intake and discharge sides; means connecting the discharge side of the pump to the chamber inlet; a source of mixable material; a source of washing fluid; means connected to the pump intake and connectible selectively to either of said sources; air inlet means connected to the intake side of the pump; means for selectively opening and closing said air inlet means and operative to open said air inlet means when the pump intake is connected to the source of mixable material and to close said air inlet means when the pump intake is connected to the source of washing fluid; and means capacitating the chamber outlet selectively to dispense mixed material or for connection to the pump intake for circulating washing fluid when the pump intake is connected to the source of washing fluid.

2. In apparatus of the class described, the combination of: means affording a mixing chamber having an inlet and an outlet; a pump having intake and discharge sides; means connecting the discharge side of the pump to the chamber inlet; a source of mixable material; a source of washing fluid; means connected to the pump intake and connectible selectively to either of said sources; air inlet means; and conduit means connected to the pump intake side and connectible selectively to the air inlet means when the pump intake side is connected to the source of mixable material or to the chamber outlet when the pump intake side is connected to the source of washing fluid so that the pump recirculates the washing fluid.

3. The invention defined in claim 1, including: drain means in the conduit means for discharging at least part of the washing fluid from the chamber so that additional washing fluid is drawn in by the pump from said source of washing fluid.

References Cited in the file of this patent

UNITED STATES PATENTS

| | | |
|---|---|---|
| 1,866,030 | Green | July 5, 1932 |
| 2,030,969 | Cushman | Feb. 18, 1936 |
| 2,544,162 | Houston | Mar. 6, 1951 |
| 2,569,235 | Giusti et al. | Sept. 25, 1951 |
| 2,645,911 | Martin | July 21, 1953 |
| 2,788,008 | Wanzer | Apr. 9, 1957 |